US 8,775,799 B2

(12) United States Patent
Kim

(10) Patent No.: US 8,775,799 B2
(45) Date of Patent: Jul. 8, 2014

(54) APPARATUS AND METHOD OF SECURELY MOVING SECURITY DATA

(75) Inventor: Ji-soo Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1508 days.

(21) Appl. No.: 11/739,976

(22) Filed: Apr. 25, 2007

(65) Prior Publication Data

US 2007/0288664 A1 Dec. 13, 2007

Related U.S. Application Data

(60) Provisional application No. 60/798,745, filed on May 9, 2006.

(30) Foreign Application Priority Data

Mar. 16, 2007 (KR) ........................ 10-2007-0026225

(51) Int. Cl.
*H04L 29/06* (2006.01)
*G06F 11/30* (2006.01)
*G06F 12/14* (2006.01)
*G06F 21/00* (2013.01)
*G06F 7/04* (2006.01)
*G06F 17/30* (2006.01)
*H04N 7/16* (2011.01)

(52) U.S. Cl.
USPC ................. 713/165; 726/26; 726/31; 726/33; 713/193; 705/51; 705/57

(58) Field of Classification Search
USPC ........ 705/901, 904, 908, 911, 57, 51; 726/26, 726/31–33; 380/201, 203, 231; 713/193
See application file for complete search history.

(56) References Cited

U.S. PATENT DOCUMENTS

| 7,526,451 | B2* | 4/2009 | Park et al. ................. 705/51 |
| 7,689,510 | B2* | 3/2010 | Lamkin et al. ............. 705/51 |
| 2002/0152393 | A1* | 10/2002 | Thoma et al. ............ 713/189 |
| 2004/0024981 | A1 | 2/2004 | Iwatsu et al. |
| 2005/0086501 | A1 | 4/2005 | Woo et al. |

(Continued)

FOREIGN PATENT DOCUMENTS

| CN | 1353365 A | 6/2002 |
| EP | 1533706 A1 | 5/2005 |

(Continued)

OTHER PUBLICATIONS

Office Action dated May 25, 2010 from the Japanese Patent Office in Japanese counterpart application No. 2009-509409.

(Continued)

*Primary Examiner* — Evans Desrosiers
*Assistant Examiner* — Daniel Potratz
(74) *Attorney, Agent, or Firm* — Sughrue Mion, PLLC

(57) ABSTRACT

Provided is an apparatus and method of securely moving security data. An apparatus for securely moving security stored in a first apparatus to a second apparatus, includes a status setting unit which set status information of the security data to a disabled state; a data providing unit which creates a copy of the security data and determines whether the created copy can be transmitted to the second apparatus; and a data deleting unit which deletes the security data when the copy is completely transmitted.

12 Claims, 7 Drawing Sheets

(56) References Cited

U.S. PATENT DOCUMENTS

| | | |
|---|---|---|
| 2005/0154907 A1 | 7/2005 | Han et al. |
| 2006/0069644 A1* | 3/2006 | Vataja et al. .................. 705/51 |
| 2006/0143132 A1* | 6/2006 | Valenti et al. ................. 705/57 |
| 2007/0172065 A1* | 7/2007 | Lee et al. ..................... 380/259 |

FOREIGN PATENT DOCUMENTS

| | | |
|---|---|---|
| EP | 1640889 A1 | 3/2006 |
| JP | 07-044464 A | 2/1995 |
| JP | 2000-347946 A | 12/2000 |
| JP | 2006-139785 A | 6/2001 |
| JP | 2001-332021 A | 11/2001 |
| JP | 2005-346401 A | 12/2005 |
| JP | 2006-85481 A | 3/2006 |
| KR | 10 2002 0061335 A | 7/2002 |
| KR | 10 2002 0081762 A | 10/2002 |
| KR | 10-2004-0061760 A | 7/2004 |
| WO | 03/005208 A1 | 1/2003 |
| WO | 03/104997 A1 | 12/2003 |

OTHER PUBLICATIONS

Office Action dated Sep. 14, 2010 from the Japanese Patent Office in Japanese counterpart application No. 2009-509409.
Search Report dated Oct. 19, 2011 from the European Patent Office in counterpart European application No. 07746267.9.

* cited by examiner

APPARATUS AND METHOD OF SECURELY MOVING SECURITY DATA

CROSS REFERENCE TO RELATED APPLICATION

This application claims priority from Korean Patent Application No. 10-2007-0026225, filed at the Korean Intellectual Property Office on Mar. 16, 2007, and U.S. Provisional Application No. 60/798,745, filed on May 9, 2006, in the United States Patent and Trademark Office, the disclosures of which are incorporated herein by reference in their entirety.

BACKGROUND OF THE INVENTION

1. Field of the Invention

Apparatuses and method consistent with the present invention relate generally to securely moving security data, and more particularly, to securely moving security data that is capable of adjusting status information of the security data when two apparatuses exchange the security data with each other and preventing an unauthorized copy from being created.

2. Description of the Related Art

Digital rights management (DRM) is a technology for protecting a copyright of digital contents and properly charging for digital contents so as to protect digital contents from being copied and distributed without authorization.

Typically, in order to protect the digital contents from being copied and distributed without authorization, only users who pay for the digital contents are permitted to access the digital contents, and users who do not pay for the digital contents cannot access the digital contents. However, because of characteristics of digital data, the digital contents can be easily reused, processed, copied, and distributed. For this reason, when users who access the digital contents after paying for the digital contents copy or distribute the digital contents without authorization, users who do not pay for the digital contents can also use the digital contents.

In order to resolve these problems, according to the DRM, the digital contents are distributed after being encrypted, and a specific license referred to as a right object (RO) is needed to use the encrypted digital contents.

The secured data, such as the digital contents or the right object, is prohibited from moving (being copied) to other apparatuses by an arbitrary user not having specific permission, except for a case where the user has specific permission. However, even when the security data moves by using a secure multimedia card (SMC), if the SMC is intentionally separated or communication errors occur between two apparatuses, copies may be easily created.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, the present invention provides an apparatus and method of securely moving security data that is capable of adjusting status information of security data so as to prevent illegal copies from being created, and securely moving the security data to other apparatuses.

According to an aspect of the present invention, there is provided an apparatus for securely moving security data stored in a first apparatus to a second apparatus, the apparatus including: a status setting unit which sets status information of the security data to a disabled state; a data providing unit which creates a copy of the security data and allows the created copy to be transmitted to the second apparatus; and a data deleting unit which deletes the security data when the copy is completely transmitted.

According to another aspect of the present invention, there is provided an apparatus for securely moving security data stored in a first apparatus to a second apparatus, the apparatus including: a receiving unit which receives a copy of security data in a disabled state from the first apparatus; and a status setting unit which sets status information of the copy to an enabled state when the security data stored in the first apparatus is deleted.

According to another aspect of the present invention, there is provided a method of securely moving security data stored in a first apparatus to a second apparatus, the method including: setting status information of the security data to a disabled state; creating a copy of the security data whose status information is set to the disabled state, and allowing the created copy to be transmitted to the second apparatus; and deleting the security data when the copy is completely transmitted.

According to another aspect of the present invention, there is provided a method of securely moving security data stored in a first apparatus to a second apparatus, the method including: receiving a copy of security data in a disabled state from the first apparatus; and setting status information of the copy to an enabled state when the security data stored in the first apparatus is deleted.

BRIEF DESCRIPTION OF THE DRAWINGS

The above and other features and advantages of the present invention will become more apparent by describing in detail preferred embodiments thereof with reference to the attached drawings in which.

DESCRIPTION OF EXEMPLARY EMBODIMENTS OF THE INVENTION

Figure 1:
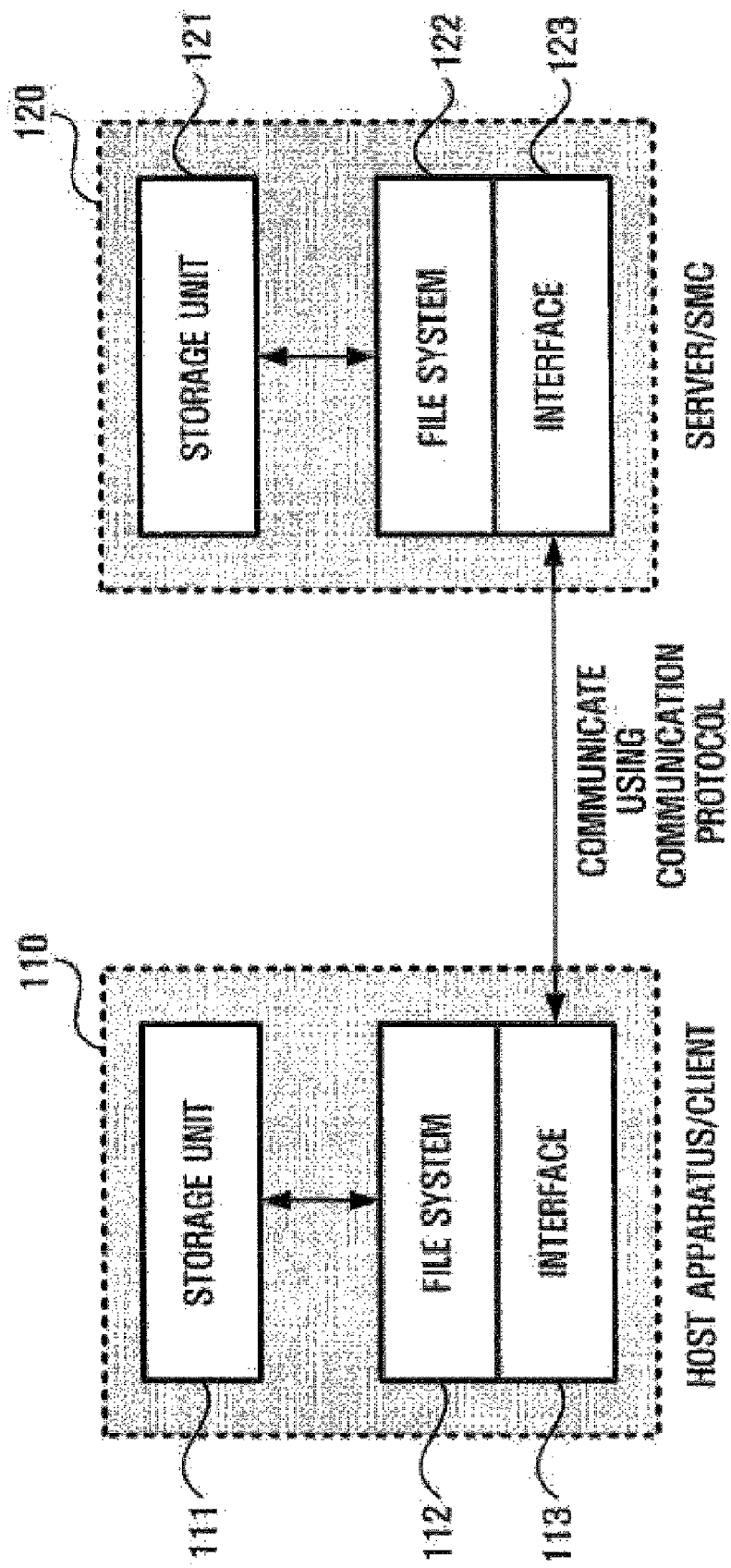
FIG. 1 is a diagram illustrating a structure of a general apparatus for storing and moving security data.

Advantages and features of the present invention and methods of accomplishing the same may be understood more readily by reference to the following detailed description of exemplary embodiments and the accompanying drawings.

The invention may, however, be embodied in many different forms and should not be construed as being limited to the embodiments set forth herein. Rather, these exemplary embodiments are provided so that this disclosure will be thorough and complete and will fully convey the concept of the present invention to those skilled in the art, and the present invention will only be defined by the appended claims.

Like reference numerals refer to like elements throughout the specification.

The present invention will be described hereinafter with reference to block diagrams or flowchart illustrations of an apparatus and method of securely moving security data according to an exemplary embodiment thereof.

It is to be understood that blocks in the accompanying block diagrams and compositions of steps in flow charts can be performed by computer program instructions.

These computer program instructions can be loaded onto processors of, for example, general-purpose computers, special-purpose computers, and programmable data processing apparatuses. Therefore, the instructions performed by the computer or the processors of the programmable data processing apparatus generate means for executing functions described in the blocks of the block diagrams or the steps in the flow charts.

The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means which performs the functions described in the blocks of the block diagrams or the steps in the flow charts.

Further, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions).

It should be noted that, in some modifications of the present invention, the functions described in the blocks or the steps may be generated out of order.

For example, two blocks or steps continuously shown can be actually performed at the same time, or they can sometimes be performed in reverse order according to the corresponding functions.

The present invention will now be described more fully with reference to the accompanying drawings, in which exemplary embodiments of the invention are shown.

FIG. 1 is a diagram illustrating a structure of a general apparatus for storing and moving security data.

A general apparatus 100 for storing and moving security data includes a first apparatus 110 and a second apparatus 120. The first apparatus 110 and the second apparatus 120 include storage units 111 and 121 in which security data is stored, file systems 112 and 122 serving as middleware by which files or directories are managed to be read or written in the apparatuses 110 and 120, and interface units 113 and 123 at which the apparatuses 110 and 120 are physically connected or connected through a network, respectively. The interface units 113 and 123 serve as a network adaptor in the case of telecommunication and serve as a USB port or a card reader in the case where a host apparatus and a peripheral apparatus, such as an SMC, communicate with each other.

In this case, the first apparatus 110 communicates with the second apparatus 120 so as to move security data, and transmits the security data to the second apparatus 120 or requests the second apparatus 120 to read files. For example, the first apparatus 110 corresponds to the client in the server and client communication, and corresponds to the host apparatus in the host apparatus and SMC communication.

Further, the second apparatus 120 communicates with the first apparatus 110 so as to move security data and receives or transmits the security data according to the request of the first apparatus 110. For example, the second apparatus 120 corresponds to the server in the server and client communication, and corresponds to the SMC in the host apparatus and the SMC communication.

For reference, it is assumed that the security data used in this invention exists in form of files.

Figure 2:
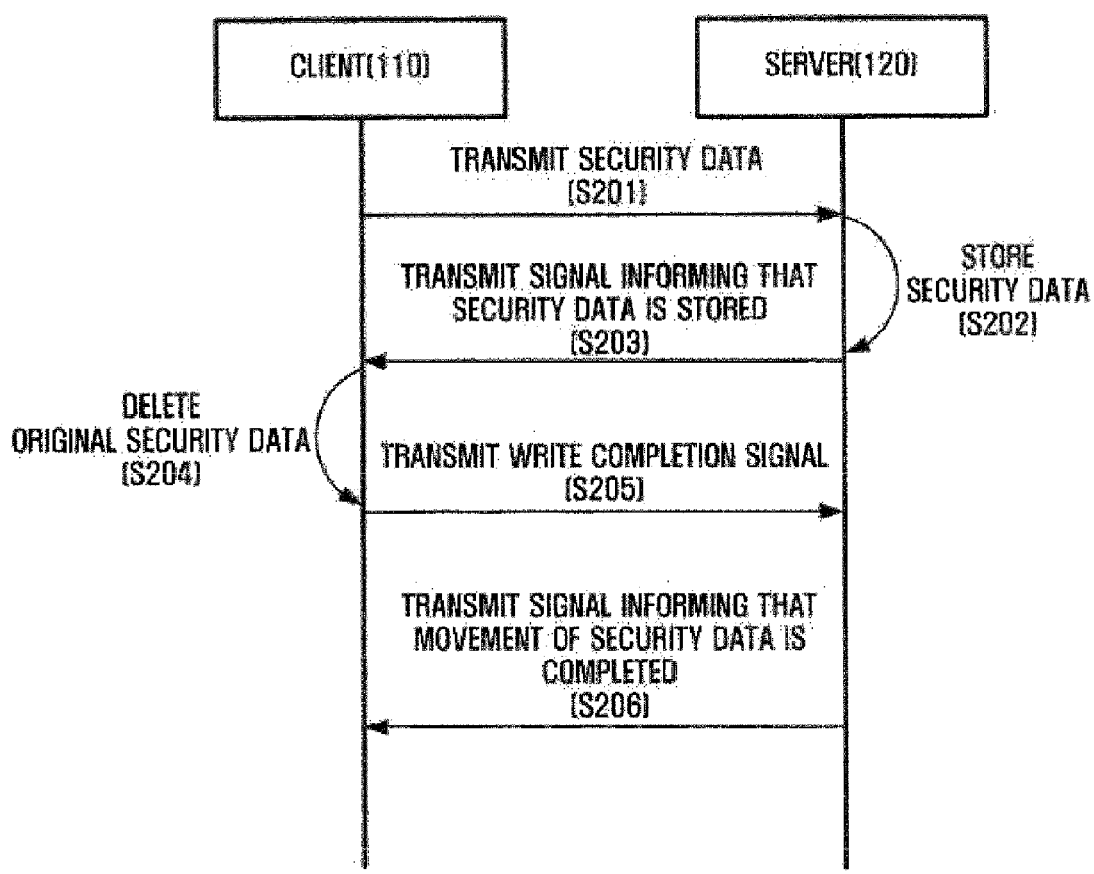
FIGS. 2 and 3 are sequential flowcharts illustrating movement of security data in apparatuses included in the apparatus shown in FIG. 1.
Figure 3:
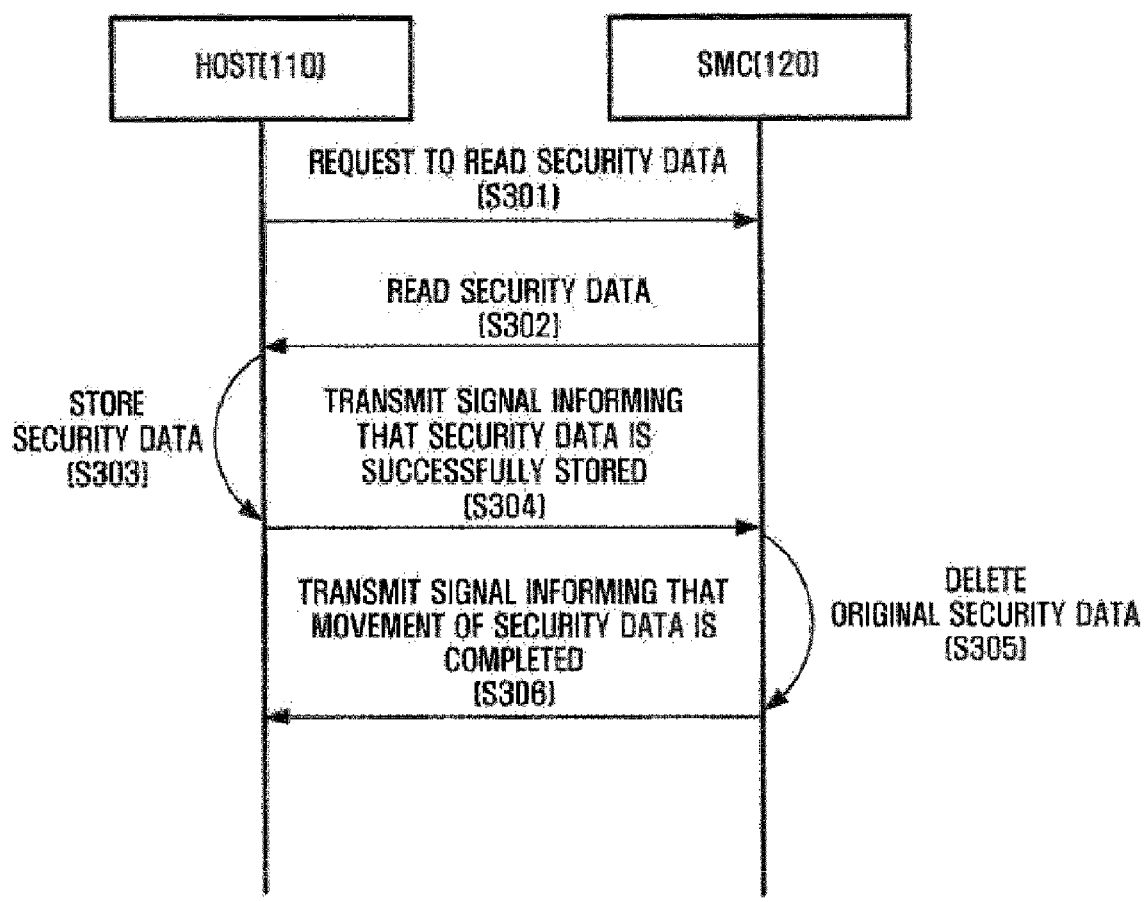

FIGS. 2 and 3 are sequential flowcharts illustrating movement of security data in apparatuses included in the apparatus shown in FIG. 1.

For convenience of explanation, it is assumed that first and second apparatuses 110 and 120 shown in FIG. 2 perform a communication between a server and a client, and the first apparatus 110 is the client and the second apparatus 120 is the server.

Further, it is assumed that first and second apparatuses 110 and 120 shown in FIG. 3 perform a communication between a host apparatus and an SMC, and the first apparatus 110 is the host apparatus and the second apparatus 120 is the SMC.

FIG. 2 shows a process of moving security data stored in the client 110 to the sever 120 according to the request of the client 110.

The client 110 transmits the security data to the server 120 (Operation S201).

After Operation S201, the server 120 stores the received security data in a storage space of the server 120 (Operation S202).

After Operation S202, the server 120 transmits to the client 110, a signal informing that the security data is successfully stored (Operation S203).

After Operation S203, the client 110 deletes the original security data (Operation S204).

After Operation S204, the client 110 transmits a write completion signal to the server 120 (Operation 205), and the server 120 transmits to the client 110, a signal informing that the movement of the security data is successfully completed (Operation S206).

FIG. 3 shows a process of moving security data stored in the SMC 120 to the host 110 according to the request of the host 110.

First, the host 110 requests the SMC 120 to read the security data (Operation S301).

After Operation S301, the host 110 reads the security data from the SMC 120 (Operation S302), and stores the read security data in a storage space of the host 110. (Operation S303).

After Operation S303, the host 110 transmits to the SMC 120, a signal informing that the security data is successfully stored (Operation S304).

After Operation S304, the SMC 120 deletes the original security data (Operation S305), and transmits to the host 110, a signal informing that the movement of the security data is completed (Operation S306).

As described above with reference to FIGS. 2 and 3, according to the DRM, when the security data moves between two different apparatuses, the security data does not exist in both of the apparatuses. However, in Operation S203 of FIG. 2, when a communication error occurs between the client 110 and the server 120, the same security data exists in both the client 110 and the server 120.

Further, in Operation S304 of FIG. 3, when a communication error occurs between the host 110 and the SMC 120, the same security data exists in both the host 110 and the SMC 120.

A mobile apparatus, such as a cellular phone, a MP3 player, and a PMP, is generally used as the first apparatus (client or host) 110. Therefore, a power supply may be unexpectedly turned off in a course of transmitting the security data. In the case of the second apparatus (server or SMC) 120, since the SMC may be easily separated from the first apparatus (client or host) 110 by a user, the transmission errors may occur intentionally or unintentionally at the time of transmitting the security data. As a result, the security data may exist in both of the apparatuses 110 and 120.

Figure 4:
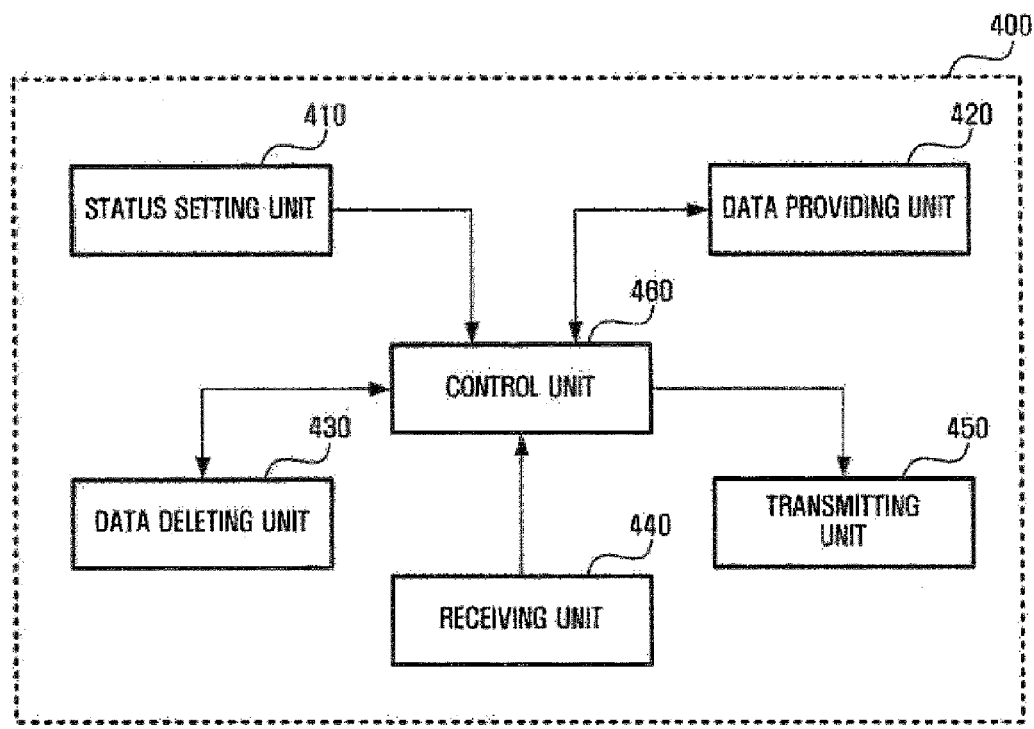
FIG. 4 is a block diagram illustrating a structure of an apparatus for securely moving security data according to an exemplary embodiment of the present invention.

FIG. 4 is a block diagram illustrating a structure of an apparatus for securely moving security data according to an exemplary embodiment of the present invention.

An apparatus 400 for securely moving security data according to an exemplary embodiment of the present invention moves security data stored in a first apparatus to a second apparatus. The apparatus 400 includes a status setting unit 410 which sets status information of the security data to a disabled state, a data providing unit 420 which creates a copy of the security data and allows the created copy to be transmitted to the second apparatus, i.e., determines whether the created copy can be transmitted, a data deleting unit 430 which deletes the security data when the copy is completely transmitted, a receiving unit 440 which receives a signal informing that the copy is completely transmitted, from the second apparatus, a transmitting unit 450 which transmits the copy created in accordance with an instruction of the data providing unit 420 to the second apparatus or transmits to the second apparatus, a signal informing that the security data is completely deleted, and a control unit 460 which controls the above-described units.

Figure 5:
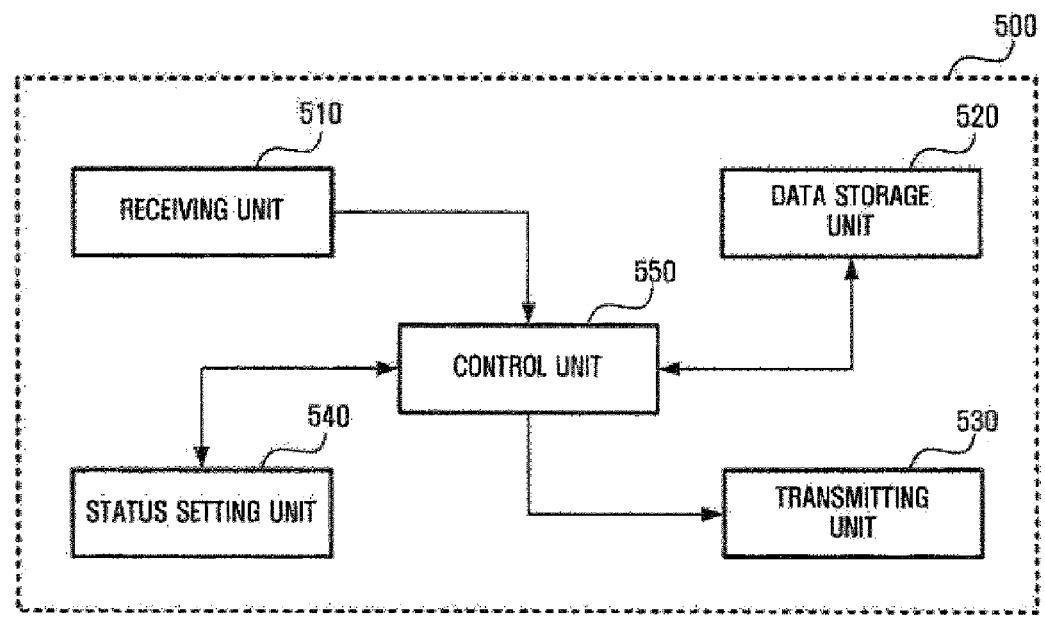
FIG. 5 is a block diagram illustrating a structure of an apparatus for securely moving security data according to another exemplary embodiment of the present invention.

FIG. 5 is a block diagram illustrating a structure of an apparatus for securely moving security data according to another exemplary embodiment of the present invention.

An apparatus 500 for securely moving security data according to another exemplary embodiment of the present invention moves security data stored in a first apparatus to a second apparatus. The apparatus 500 includes a receiving unit 510 which receives a copy of security data in a disabled state from a first apparatus or receives a signal informing that the security data is deleted from the first apparatus, a storage unit 520 which stores the received copy, a transmitting unit 530 which transmits, when the copy received by the receiving unit 510 is stored in the data storage unit 520, a signal informing that the copy is completely received, a status setting unit 540 which sets status information of the copy to an enabled state when the security data stored in the first apparatus is deleted, and a control unit 550 which controls the above-described units.

Meanwhile, the term "unit" shown in FIGS. 4 and 5, that is, "module" or "table" means software, or a hardware component such as an FPGA (Field Programmable Gate Array) or an ASIC (Application Specific Integrated Circuit) and the modules each perform assigned functions.

However, the modules are not limited to software or hardware. The modules may be configured in an addressable storage medium, or may be configured to run on at least one processor.

Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables.

The functions provided by the components and the modules may be combined into fewer components and/or modules may be separated into additional components and modules.

The status setting unit 410 included in the apparatus 400 shown in FIG. 4 sets the status information of security data.

Here, the status information indicates either a disabled state or an enabled state of security data. The disabled state is a state where the security data cannot be used. When status information of the security data is set to a disabled state by the status setting unit 410, the corresponding security data functions as a deleted file until the security data satisfies predetermined conditions.

However, the user cannot arbitrarily change the status information of the security data to a disabled or enabled state, and the disabled or enabled state of the security data can be changed by the status setting unit 410 in accordance with a DRM operation.

At this time, as a method of representing status information of the security data, the status information of the security data may be managed by using status information fields that exist in a reference table of a file system or separate tables that match to the status information fields, respectively. The status information can be represented by a minimum of one bit (for example, 1 or 0) of information.

Figure 6:
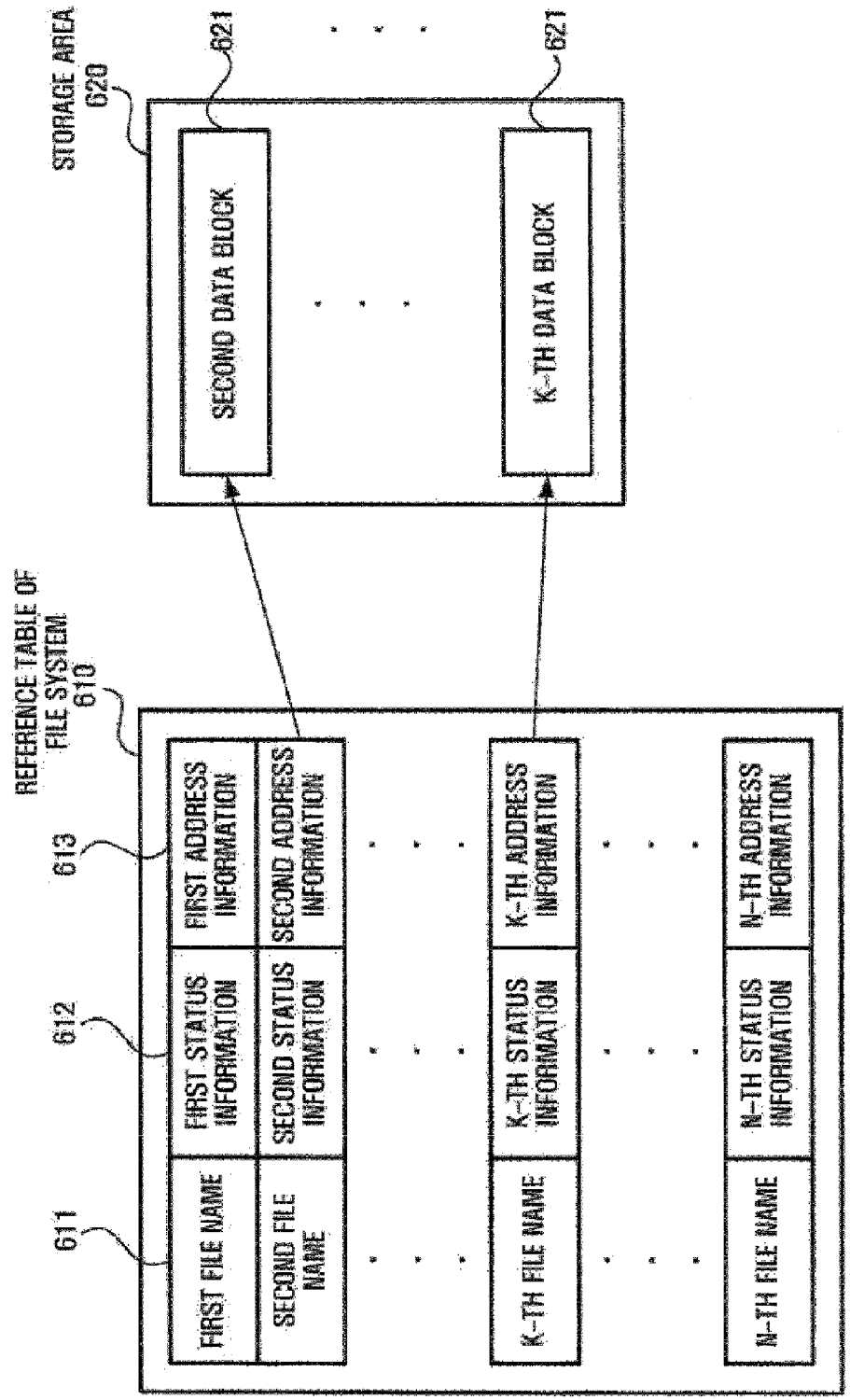
FIG. 6 is a diagram illustrating a storage area and a reference table of a file system that includes status information of security data according to an exemplary embodiment of the present invention.

For reference, FIG. 6 is a diagram illustrating a storage area and a reference table of a file system that includes status information of security data according to an exemplary embodiment of the present invention, which illustrates a method of reading security data that exists in actual data blocks 621 in a storage area 620 by using a reference table 610 that exists in the file system.

The reference table 610 shown in FIG. 6 includes file names 611 of actual security data that are referred to in the file system, status information (0 or 1) 612 of the security data that is referred to in the file system, and address information 613 in the storage area 620 where the security data to be referred to in the file system exists.

For reference, the security data is actually located in the data blocks 621 of the storage area 620, and the status information 612 in the reference table 610 further includes at least one of a file size, permission, and a created date and time of the security data.

Meanwhile, the data providing unit 420 creates a copy of the security data, and transmits the created copy to the other apparatus (hereinafter, referred to as second apparatus).

At this time, the data providing unit 420 refers to the status information of the security data, and creates a copy of the security data when the status information of the security data indicates a disabled state.

Hereinafter, the data providing unit 420 transmits a signal informing that the copy is created to the control unit 460, and the control unit 460 allows the transmitting unit 450 to transmit the corresponding copy to the second apparatus.

If the copy is completely transmitted by the transmitting unit 450, that is, the second apparatus that has received the copy transmits a signal informing that the copy is completely transmitted, the receiving unit 440 receives the signal, the control unit 460 informs the data deleting unit 430 that the copy is completely transmitted, and the data deleting unit 430 deletes the stored original security data.

If the data deleting unit 430 deletes the original security data, the control unit 460 informs the transmitting unit 450 that the data deleting unit 430 deleted the original security data, and the transmitting unit 450 transmits a signal informing that the original security data is deleted to the second apparatus.

Meanwhile, in the apparatus 500 shown in FIG. 5, the receiving unit 510 receives a copy of security data in a disabled state from another apparatus (hereinafter, referred to as first apparatus).

If the receiving unit 510 receives the copy, the control unit 550 informs the data storage unit 520 that the receiving unit 510 received the copy, and the data storage unit 520 stores the copy of the security data in the disabled state that has been received from the receiving unit 510.

If the data storage unit 520 stores the above-described copy, the control unit 550 informs the transmitting unit 530 that the data storage unit 520 stored the above-described copy, and the transmitting unit 530 transmits to the first apparatus, a signal informing that the copy is completely received.

Hereinafter, when a signal informing that the original security data is deleted is transmitted from the first apparatus, the receiving unit 510 receives the corresponding signal, the control unit 550 informs the status setting unit 540 that the original security data is deleted, and the status setting unit 540 sets status information of the copy from a disabled state to an enabled state.

Accordingly, since the status information of the stored security data is set to an enabled state, the user can use the security data according to the permission of the stored security data.

Figure 7:
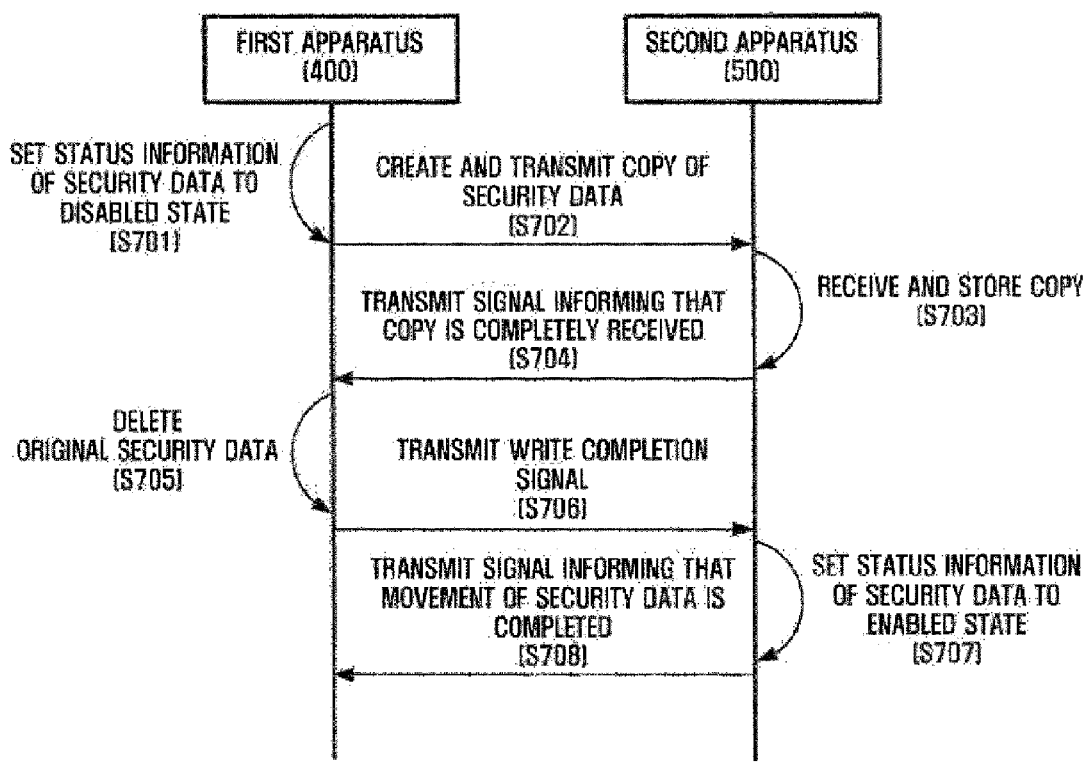
FIG. 7 is a flowchart illustrating a process of a method of securely moving security data according to an exemplary embodiment of the present invention.

FIG. 7 is a flowchart illustrating a process of a method of securely moving security data according to an exemplary embodiment of the present invention.

For convenience of explanation, the method will be described with reference to the apparatuses 400 and 500 shown in FIGS. 4 and 5, and the apparatus 400 shown in FIG. 4 is referred to a first apparatus, and the apparatus 500 shown in FIG. 5 is referred to as a second apparatus.

FIG. 7 shows a process of moving security data stored in the first apparatus 400 to the second apparatus 500.

A status setting unit 410 of the first apparatus 400 sets status information of the security data to a disabled state (Operation S701).

After Operation S701, the data providing unit 420 of the first apparatus 400 creates a copy of security data that is set to a disabled state, and the transmitting unit 450 transmits the created copy to the second apparatus 500 (Operation S702).

After Operation S702, the receiving unit 510 of the second apparatus 500 receives a copy of the security data that is set to the disabled state, and the data storage unit 520 of the second apparatus 500 stores the received copy in the storage space (Operation S703).

After Operation S703, the transmitting unit 530 transmits a signal informing that the copy is completely received to the first apparatus 400 (Operation S704).

After Operation S704, the receiving unit 440 of the first apparatus 400 receives the signal transmitted in Operation S704, and the data deleting unit 430 deletes the original security data (Operation S705).

After Operation S705, the transmitting unit 450 transmits to the second apparatus 500, a write completion signal informing that the original security data is deleted (Operation S706).

After Operation S706, the receiving unit 510 of the second apparatus 500 receives the signal transmitted in Operation S706, and the status setting unit 540 sets status information of the copy of the security data stored in a disabled state to an enabled state (Operation S707).

After Operation S707, the transmitting unit 530 transmits to the first apparatus 400, a signal informing that movement of the security data is completed (Operation S708).

Figure 8:
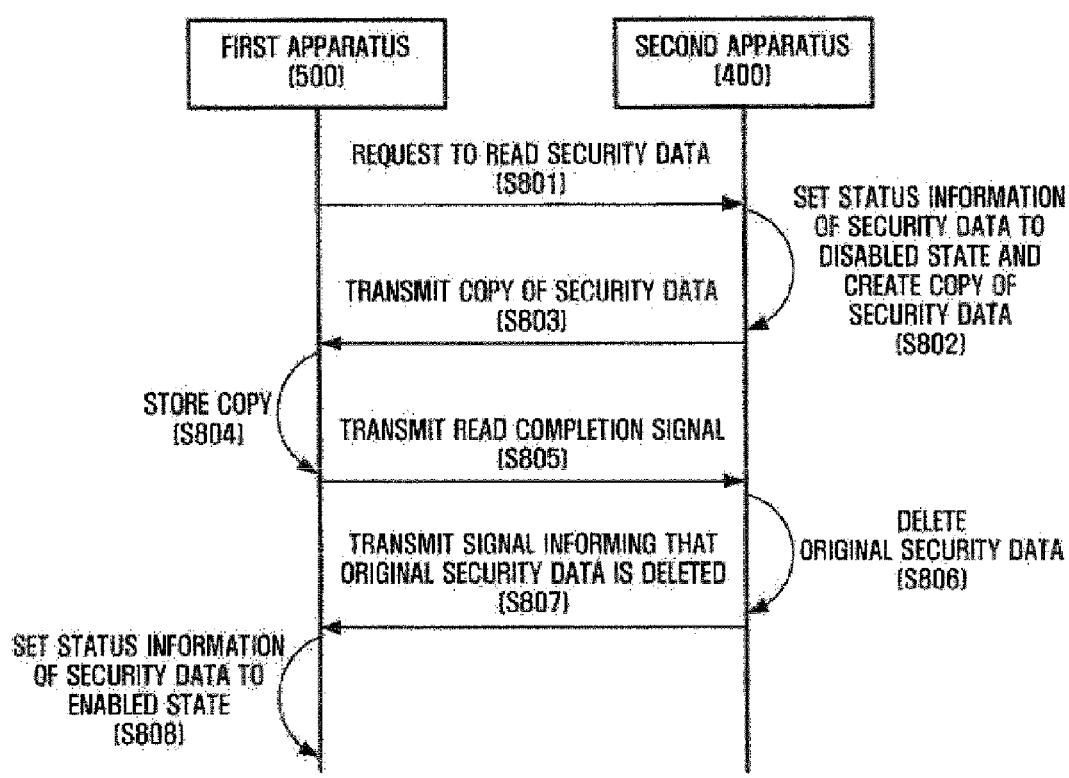
FIG. 8 is a flowchart illustrating a process of a method of securely moving security data according to another exemplary embodiment of the present invention.

FIG. 8 is a flowchart illustrating a process of a method of securely moving security data according to another exemplary embodiment of the present invention.

For convenience of explanation, the method will be described with reference to the apparatuses 400 and 500 shown in FIGS. 4 and 5, and the apparatus 400 shown in FIG. 4 is referred to a second apparatus, and the apparatus 500 shown in FIG. 5 is referred to as a first apparatus.

FIG. 8 shows a process of moving security data stored in the second apparatus 400 to the first apparatus 500.

The first apparatus 500 requests the second apparatus 400 to read specific security data (Operation S801).

After Operation S801, the status setting unit 410 of the second apparatus 400 sets status information of the corresponding security data to a disabled state, and the data providing unit 420 creates a copy of the security data that is set to the disabled state (Operation S802).

After Operation S802, the transmitting unit 450 of the second apparatus 400 transmits the created copy to the first apparatus 500 (Operation S803).

After Operation S803, the receiving unit 510 of the first apparatus 500 receives a copy of security data that is set to the disabled state, and the data storage unit 520 of the first apparatus 500 stores the received copy in a storage space (Operation S804).

After Operation 804, the transmitting unit 530 transmits to the second apparatus 400, a read completion signal informing that the copy of the security data is completely received (Operation S805).

After Operation S805, the receiving unit 440 of the second apparatus 400 receives the signal transmitted in Operation S805, and the data deleting unit 430 deletes the original security data (Operation S806).

After Operation S806, the transmitting unit 450 transmits to the first apparatus 500, a signal informing that the original security data is deleted (Operation S807).

After Operation S807, the receiving unit 510 of the first apparatus 500 receives the signal transmitted in Operation S807, and the status setting unit 540 sets to an enabled state, status information of the copy of the security data that is stored in a disabled state (Operation S808).

As a result, even when communication errors occur between the two apparatuses 400 and 500 in Operations 704 and 805 shown in FIGS. 7 and 8, the status information of the copy indicates a disabled state, that is, a state where the copy is deleted, which does not cause a case where the original security data and the copy thereof simultaneously exist in the two apparatuses 400 and 500.

Although the present invention has been described in connection with the exemplary embodiments of the present invention, it will be apparent to those skilled in the art that various modifications and changes may be made thereto without departing from the scope and spirit of the present invention. Therefore, it should be understood that the above embodiments are not limiting, but illustrative in all aspects.

According to the apparatus and method of securely moving security data according to the embodiments of the present invention, the following effects can be achieved.

It is possible to efficiently represent and manage permission of security data without lowering compatibility with the file system according to the related art.

Further, even if communication errors unexpectedly occur at the time of moving security data between two different apparatuses, there is not another copy of the original security data. Therefore, it is possible to securely move the security data while requirements of the DRM are satisfied.

What is claimed is:

1. An apparatus including a processor and memory for securely moving security data stored in a first apparatus to a second apparatus, the apparatus comprising:
   a status setting unit which sets status information of the security data from an enabled state to a disabled state, wherein the status information is stored in a first reference table in the first apparatus;
   a data providing unit which creates a copy of the security data set to the disabled state and determines if the created copy of the security data can be transmitted to the second apparatus;
   a data deleting unit which deletes the security data stored in the first apparatus in response to receiving a signal from the second apparatus affirming that the copy of security data is completely transmitted;
   a transmitting unit which transmits, to the second apparatus, the copy of security data in response to determining that the created copy of the security data can be transmitted to the second apparatus, and a signal affirming the second apparatus that the security data stored in the first apparatus is completely deleted;
   only in response to receiving the signal affirming that the security data is completely deleted, the second apparatus, without further inquiry, changes status information of the copy of security data to the enabled state from the disabled state, wherein the status information is stored in a second reference table in the second apparatus;
   wherein the status information stored in the first and second reference tables is only changed by a specific Digital Rights Management (DRM) operation; and
   wherein the security data and the copy of security data set to the disabled state function as deleted data.

2. The apparatus of claim 1, wherein the status information of the security data is stored as a single bit in a status information field of the first reference table stored in the first apparatus.

3. An apparatus including a processor and memory for securely moving security data stored in a first apparatus to a second apparatus, the apparatus comprising:
   a receiving unit which receives a copy of security data set to a disabled state from the first apparatus, wherein the copy of security data is a copy of the security data stored in the first apparatus having status information, stored in a first reference table in the first apparatus, set to the disabled state;
   a status setting unit which sets status information of the copy of the security data to an enabled state, only in response to the second apparatus receiving a signal affirming that the security data is completely deleted from the first apparatus, wherein the status information is stored in a second reference table in the second apparatus;
   a transmitting unit which transmits to the first apparatus, in response to completely receiving the copy of security data from the first apparatus, a signal affirming that the copy of the security data is completely received; and
   wherein the first apparatus, in response to receiving the signal affirming that the copy of security data is completely received, transmits the signal affirming that the security data stored in the first apparatus is completely deleted to the second apparatus;
   only in response to receiving the signal affirming that the security data is completely deleted from the first apparatus, and without further inquiry, the second apparatus changes the status information of the copy of security data to the enabled state from the disabled state;
   wherein the status information stored in the first and second reference tables is only changed by a specific Digital Rights Management (DRM) operation,
   wherein the security data and the copy of security data set to the disabled state functions as deleted data.

4. The apparatus of claim 3, wherein the status information of the copy of security data is stored as a single bit in a status information field of the second reference table stored in the second apparatus.

5. A method for securely moving security data stored in a first apparatus to a second apparatus, the method comprising:
   setting status information of the security data from an enabled state to a disabled state, wherein the status information is stored in a first reference table in the first apparatus;
   creating a copy of the security data set to the disabled state, and determining if the created copy of the security data can be transmitted to the second apparatus;
   deleting the security data stored in the first apparatus in response to receiving a signal from the second apparatus affirming that the copy of the security data is completely transmitted;
   transmitting, to the second apparatus, the copy of the security data in response to determining that the created copy of the security data can be transmitted to the second apparatus, and a signal affirming the second apparatus that the security data stored in the first apparatus is completely deleted in response to deleting the security data stored in the first apparatus; and
   only in response to receiving the signal affirming that the security data is completely deleted, and without further inquiry, changing, by the second apparatus, the status information of the copy of the security data to the enabled state from the disabled state, wherein the status information is stored in a second reference table in the second apparatus;
   wherein the status information stored in the first and second reference tables is only changed by a specific Digital Rights Management (DRM) operation; and
   wherein the security data and the copy of security data set to the disabled state function as deleted data.

6. The method of claim 5, wherein the status information of the security data is stored as a single bit in a status information field of the first reference table stored in the first apparatus.

7. A method for securely moving security data stored in a first apparatus to a second apparatus, the method comprising:
   receiving a copy of security data set to a disabled state from the first apparatus, wherein the copy of security data is a copy of the security data stored in the first apparatus having status information, stored in a first reference table in the first apparatus, set to the disabled state;
   setting status information of the copy of security data to an enabled state, only in response to the second apparatus receiving a signal affirming that the security data is completely deleted from the first apparatus, wherein the status information is stored in a second reference table in the second apparatus;
   transmitting to the first apparatus, in response to completely receiving the copy of security data from the first apparatus, a signal affirming that the copy of security data is completely received;

wherein the first apparatus, in response to receiving the signal affirming that the copy of security data is completely received, transmits the signal affirming that the security data stored in the first apparatus is completely deleted to the second apparatus;

only in response to receiving the signal affirming that the security data is completely deleted from the first apparatus, and without further inquiry, the second apparatus changes the status information of the copy of security data to the enabled state from the disabled state;

wherein the status information stored in the first and second reference tables is only changed by a specific Digital Rights Management (DRM) operation, wherein the security data and the copy of security data set to the disabled state functions as deleted data.

8. The method of claim 7, wherein the status information of the copy of security data is stored as a single bit in a status information field of the second reference table stored in the second apparatus.

9. A method for securely moving secured data stored in a first apparatus to a second apparatus, the method comprising:

changing, by the first apparatus, status information of the secured data to a disabled state from an enabled state, wherein the status information is stored in a first reference table in the first apparatus;

creating, by the first apparatus, a copy of the security data set to the disabled state;

transmitting, by the first apparatus, the copy of the secured data set to the disabled state to the second apparatus;

in response to the second apparatus completely receiving the copy of the secured data, transmitting, by the second apparatus, a signal to the first apparatus affirming that the copy of the secured data is completely received by the second apparatus, in response to the first apparatus receiving the signal affirming that the copy of the secured data is completely received by the second apparatus, deleting, by the first apparatus, the secured data stored in the first apparatus and transmitting a write completion signal to the second apparatus affirming the second apparatus that the secured data is completely deleted from the first apparatus, and only in response to receiving the write completion signal affirming that the secured data is completely deleted, and without further inquiry, changing, by the second apparatus, the status information of the copy of the secured data to the enabled state from the disabled state, wherein the status information is stored in a second reference table in the second apparatus, wherein the status information stored in the first and second reference tables is only changed by a specific Digital Rights Management (DRM) operation; and wherein the secured data and the copy of secured data set to the disabled state function as deleted data.

10. The method of claim 9, wherein the status information of the secured data is stored as a first single bit in a first status information field of the first reference table stored in the first apparatus, and the first apparatus changing the first single bit from a bit indicating that the secured data is in an enabled state to another bit indicating that the secured data is in a disabled state, and the status information of the copy of secured data is stored in a second single bit in a second status information field of the second reference table stored in the second apparatus, and the second apparatus changing the second single bit from a bit indicating that the copy of the secured data is in a disabled state to another bit indicating that the copy of the secured data is in an enabled state.

11. The method of claim 10, wherein the first reference table includes the status information for each secured data of a plurality of secured data stored in the first apparatus, and the second reference table includes the status information for each copy of secured data of a plurality of copies of secured data in the second apparatus.

12. The method of claim 9, wherein the secured data is encrypted digital content requiring a rights object to be accessed.

* * * * *